(12) United States Patent
Cooper et al.

(10) Patent No.: US 11,643,120 B2
(45) Date of Patent: *May 9, 2023

(54) INDEPENDENT CART SYSTEM AND METHOD OF OPERATING THE SAME

(71) Applicant: Rockwell Automation Technologies, Inc., Mayfield Heights, OH (US)

(72) Inventors: Mark R. Cooper, Eden Prairie, MN (US); David D. Van Dorpe, Eden Prairie, MN (US); Patrick E. Ozimek, Mequon, WI (US); Shankernarayan Ramanarayanan, Eden Prairie, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 81 days.

This patent is subject to a terminal disclaimer.

(21) Appl. No.: 17/213,589

(22) Filed: Mar. 26, 2021

(65) Prior Publication Data

US 2021/0213984 A1 Jul. 15, 2021

Related U.S. Application Data

(63) Continuation of application No. 16/184,389, filed on Nov. 8, 2018, now Pat. No. 10,967,892.

(51) Int. Cl.
*B61L 23/14* (2006.01)
*B61C 3/00* (2006.01)
(Continued)

(52) U.S. Cl.
CPC ............... *B61L 23/14* (2013.01); *B61C 3/00* (2013.01); *B61L 25/04* (2013.01); *G05D 1/0088* (2013.01);
(Continued)

(58) Field of Classification Search
CPC ............ B61L 23/14; B61L 25/04; B61C 3/00; G05D 1/0088; G05D 1/0291;
(Continued)

(56) References Cited

U.S. PATENT DOCUMENTS 6,191,507 B1 2/2001 Peltier
RE39,747 E 7/2007 Peltier
(Continued)

FOREIGN PATENT DOCUMENTS

WO 98/50760 A2 11/1998
WO 2017/089182 A1 6/2017

OTHER PUBLICATIONS

Extended European Search Report dated Apr. 14, 2020; Application No. 19208005.9—(7) pages.
(Continued)

*Primary Examiner* — Mussa A Shaawat
(74) *Attorney, Agent, or Firm* — Boyle Fredrickson, SC

(57) ABSTRACT

A method and system for motion control of movers in an independent cart system is disclosed. In one implementation, the independent cart system includes a plurality of track segments, each section having a respective controller. One of the controllers receives a motion command for a plurality of carts, respectively. The controller generates a force command for each of the plurality of carts and transmits the respective commands to the track segments commutating the plurality of carts.

20 Claims, 11 Drawing Sheets

(51) Int. Cl.
*B61L 25/04* (2006.01)
*G05D 1/00* (2006.01)
*G05D 1/02* (2020.01)

(52) U.S. Cl.
CPC .............. *G05D 1/0291* (2013.01); *G05D 2201/0216* (2013.01)

(58) Field of Classification Search
CPC ......... G05D 2201/41327; G05B 2219/45054; G05B 19/4189
See application file for complete search history.

(56) References Cited

U.S. PATENT DOCUMENTS

| | | | |
|---|---|---|---|
| 7,421,193 B2 | 9/2008 | Kobayashi | |
| 7,448,327 B2 | 11/2008 | Thornton | |
| 7,806,254 B2* | 10/2010 | Brayman | B65G 21/06 |
| | | | 198/833 |
| 7,905,345 B2* | 3/2011 | Taylor | B65G 47/261 |
| | | | 198/781.05 |
| 8,050,795 B2* | 11/2011 | Dollens | G05B 19/4189 |
| | | | 198/571 |
| 8,061,506 B2* | 11/2011 | Schafer | B65G 47/31 |
| | | | 198/444 |
| 8,100,254 B2* | 1/2012 | Balk | B65G 47/261 |
| | | | 198/468.8 |
| 8,284,993 B2* | 10/2012 | Taylor | B65G 43/10 |
| | | | 198/300 |
| 8,322,515 B2* | 12/2012 | Rausch | B65G 47/681 |
| | | | 209/622 |
| 8,863,669 B2 | 10/2014 | Young | |
| 9,102,336 B2* | 8/2015 | Rosenwinkel | H04B 10/114 |
| 9,346,371 B2 | 5/2016 | King | |
| 9,555,977 B2 | 1/2017 | Combs | |
| 9,997,985 B2 | 6/2018 | Prussmeier | |
| 10,261,491 B1 | 4/2019 | Dunham | |
| 2006/0030968 A1 | 2/2006 | Ko | |
| 2008/0006172 A1 | 1/2008 | Thornton | |
| 2012/0024669 A1* | 2/2012 | Danelski | B65G 13/02 |
| | | | 198/781.05 |
| 2012/0048682 A1* | 3/2012 | Itoh | B65G 13/02 |
| | | | 198/780 |
| 2012/0247925 A1* | 10/2012 | Cooke | B65G 43/00 |
| | | | 198/619 |
| 2015/0344233 A1 | 12/2015 | Kleinikkink | |
| 2015/0360581 A1 | 12/2015 | King | |
| 2016/0139585 A1 | 5/2016 | Hessenauer et al. | |
| 2016/0260158 A1 | 9/2016 | High | |
| 2016/0355350 A1 | 12/2016 | Yamamoto | |
| 2017/0054400 A1* | 2/2017 | Kumazawa | H02K 41/03 |
| 2017/0225902 A1 | 8/2017 | Harper | |
| 2017/0229991 A1 | 8/2017 | Huber | |
| 2017/0344009 A1* | 11/2017 | Wernersbach | G08G 1/00 |
| 2018/0090254 A1 | 3/2018 | Ozimek | |
| 2019/0047799 A1* | 2/2019 | Spotti | B65G 35/06 |
| 2019/0067508 A1* | 2/2019 | Spotti | H01L 21/67288 |
| 2019/0084781 A1 | 3/2019 | Huang | |
| 2019/0367290 A1 | 12/2019 | Papsdorf | |
| 2019/0367291 A1 | 12/2019 | Papsdorf | |

OTHER PUBLICATIONS

European Communication pursuant to Article 94(3) EPC dated Oct. 21, 2021; Application No. 19 208 005.9—(5) pages.

* cited by examiner

INDEPENDENT CART SYSTEM AND METHOD OF OPERATING THE SAME

CROSS-REFERENCE TO RELATED APPLICATIONS

This application is a continuation of and claims priority to U.S. application Ser. No. 16/184,389, filed Nov. 8, 2018, the entire contents of which is incorporated herein by reference.

BACKGROUND INFORMATION

The subject matter disclosed herein relates to independent cart technology (ICT) and, more specifically, to a method and system for motion control of movers in independent cart systems.

An independent cart system (ICS) utilizing movers can be used in a wide variety of processes (e.g. packaging, manufacturing, and machining). ICSs can provide an advantage over conventional conveyor belt systems with enhanced flexibility, extremely high-speed movement, and mechanical simplicity. Successive activation of electric coils establishes a moving electromagnetic field that interacts with magnets of a mover and causes the mover to travel along a track. Sensors may be spaced at fixed positions along the track and/or on the movers to provide information about the position and speed of the movers.

In a typical system, the track forms a closed path over which each mover repeatedly travels. At certain positions along the track other actuators (e.g., part of a robotic system) may interact with each mover. For example, the mover may be stopped at a loading station at which a first actuator places a product on the mover. The mover may then be moved along a process portion of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product. The ICS and the external actuator(s) collectively form an automated transport system.

Historically, a central computer for a motion control system collects and distributes servo control state variables for all movers and track segments in the system. The central computer, referred to by some as a "gateway computer," has connections to a system controller performing coordinated motion and to all of the track segments. The central computer distributes control state variables to the individual track segments for motion control of the movers. Utilizing a central computer results in high costs for small tracks and slow update rates between the central computer and the individual track segments.

Thus, it would be desirable to provide an improved method and system for motion control of movers in ICSs.

BRIEF DESCRIPTION

In embodiments of the invention, an improved method and system for motion control of movers in ICSs includes partitioning servo control commands into motion control commands and force control commands, and separating execution of these functions. The method and system allow a fixed connection to the motion controller but enable distributed control over multiple track segments on a track. Motion control responsibility for all the movers in the ICS are spread over many devices and does not have to be concentrated on one device. The embodiments eliminate the centralized computer as a gateway between the system controller doing coordinated motion and the track segments doing the motion movement. The elimination of the central computer allows for smaller tracks to be more cost effective, but the automated transport system also supports large tracks (e.g., up to 128 movers on 64 segments). The system provides enough computing power to perform motion control, but minimize product cost.

According to one embodiment of the invention, a motion system having an automated independent cart system is disclosed. The automated independent cart system includes a mover having a drive magnet, a first track segment, and a second track segment. The first track segment includes a first plurality of drive coils positioned along a first length of the first track segment, a first drive coupled to the first plurality of drive coils, and a first controller coupled to the first drive. The first controller selectively controls the first drive to energize the first plurality of drive coils for establishing a first electromagnetic field to interact with the drive magnet on the mover for moving the mover along the first track segment. The second track segment includes a second plurality of drive coils positioned along a second length of the second track segment, a second drive coupled to the second plurality of drive coils, and a second controller coupled to the second drive. The second controller selectively controls the second drive to energize the second plurality of drive coils for establishing a second electromagnetic field to interact with the drive magnet for moving the mover along the second track segment. The second controller also receives a position feedback related to a position of the mover and generates a force command based on the position feedback. The first controller selectively controls the first drive and the second controller selectively controls the second drive based on the force command. In some additional embodiments a motion controller generates a motion command, where the force command is further based on the motion command.

According to another embodiment of the invention, a method of controlling operation of a plurality of movers traveling along an automated independent cart system is disclosed. The system including a track having a plurality of track segments, each track segment having a respective controller. The method includes the steps of receiving, at a first controller for a first track segment, a motion command for a first mover; receiving, at the first controller, a position feedback corresponding to a location for the first mover along the track; determining, at the first controller, a force command for the first mover based on the motion command and the position feedback; and generating an excitation field to interact with a magnet of the mover based on the force command. The generating the excitation field can be at the first controller or at a second controller for a second track segment. In additional embodiments, the system further includes a backplane communicatively coupling the respective controllers of the plurality of track segments, and the method further includes communicating the position feedback and the force command over the backplane.

According to still another embodiment of the invention, a method of controlling operation of multiple movers traveling along an independent cart system is disclosed. The independent cart system includes a track having multiple track segments. A motion command for a first mover is obtained at a first controller. The first controller receives from a segment controller for one of the track segments a position feedback signal corresponding to a location for the first mover along the track segment corresponding to the segment controller. The first controller determines a force command for the first mover based on the motion command and the position feedback signal, and the segment controller controls an excitation field to interact with a drive member mounted on the mover based on the force command.

According to yet another embodiment of the invention, an independent cart system includes a track having multiple track segments, where each track segment includes multiple drive coils, and a segment controller configured to selectively control the drive coils to generate an excitation field along the corresponding track segment. The independent cart system also includes multiple movers and a position feedback system. Each mover includes a drive member configured to interact with the excitation field, and a position feedback system configured to generate multiple position feedback signals, where each position feedback signal corresponds to a location of one of the movers. A first controller is configured to obtain a motion command for a first mover, where the first mover is selected from the multiple movers. The first controller receives from the segment controller for one of the track segments the position feedback signal corresponding to a location of the first mover along the track and determines a force command for the first mover. The first controller transmits the force command for the first mover to the segment controller.

According to still another embodiment of the invention, an independent cart system includes a track and multiple movers. The track has at least a first track segment and a second track segment. The first track segment includes a first set of drive coils and a first segment controller. The first segment controller is configured to selectively control the first set of drive coils to generate a first excitation field along the first track segment. The second track segment includes a second set of drive coils and a second segment controller. The second segment controller is configured to selectively control the second set of drive coils to generate a second excitation field along the second track segment. Each mover includes a drive member configured to interact with the first and second excitation fields. The first segment controller is configured to receive a position feedback signal for a first mover, receive a motion command for the first mover, and determine a force command for the first mover. The first mover is one of the movers not present on the first track segment. The second segment controller is configured to receive a position feedback signal for a second mover, receive a motion command for the second mover, and determine a force command for the second mover. The second mover is one of the movers not present on the second track segment.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings, in which.

Figure 1:
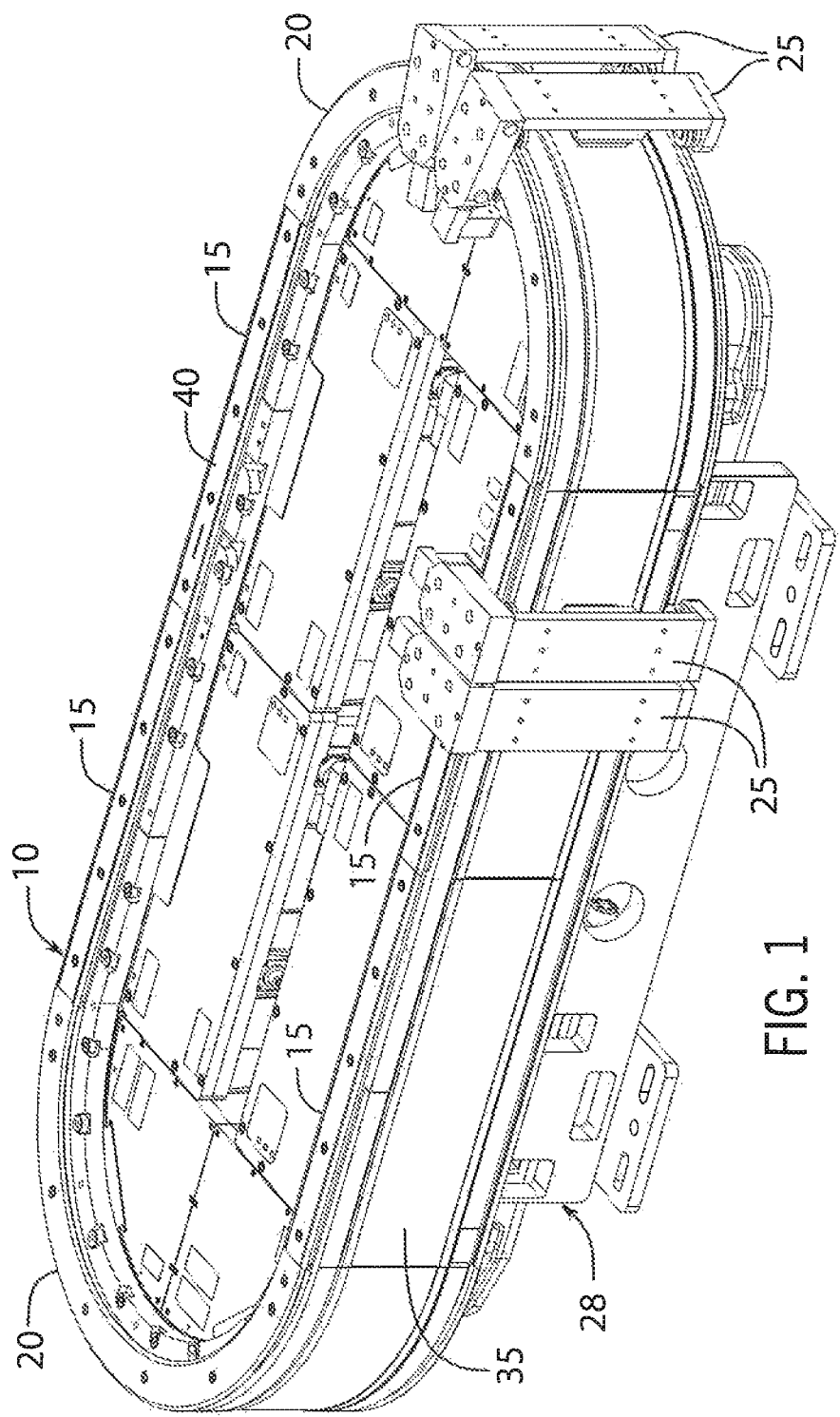
FIG. 1 is an isometric view of an exemplary automated independent cart system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary automated cart system for moving articles or products includes a track 10 made up of multiple segments 15, 20. According to the illustrated embodiment, the segments (also referred to herein as "track segments") define a closed loop supporting movers 25 movable along the track 10. The track 10 is oriented in a horizontal plane and supported above the ground by a base 28 extending vertically downward from the track 10. The illustrated track 10 includes four straight segments 15, with two straight segments 15 located along each side of the track and spaced apart from the other pair. The track 10 also includes four curved segments 20 where a pair of curved segments 20 is located at each end of the track 10 to connect the pairs of straight segments 15. The four straight segments 15 and the four curved segments 20 form an oval track and define a closed surface over which each of the movers 25 may travel. It is understood that track segments of various sizes, lengths, and shapes may be connected together to form a track 10 and the track may include multiple branches or open-ended segments without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, and various combinations thereof. Further, each track segment 15, 20 is shown in a generally horizontal orientation. The track segments 15, 20 may also be oriented in a generally vertical orientation and the width of the track 10 may be greater in either the horizontal or vertical direction according to application requirements. The movers 25 will travel along the track and take various orientations according to the configuration of the track 10 and the relationships discussed herein. For example, the exemplary construction shown has a transverse drive structure; other structures are possible including a planar drive structure.

Figure 2:
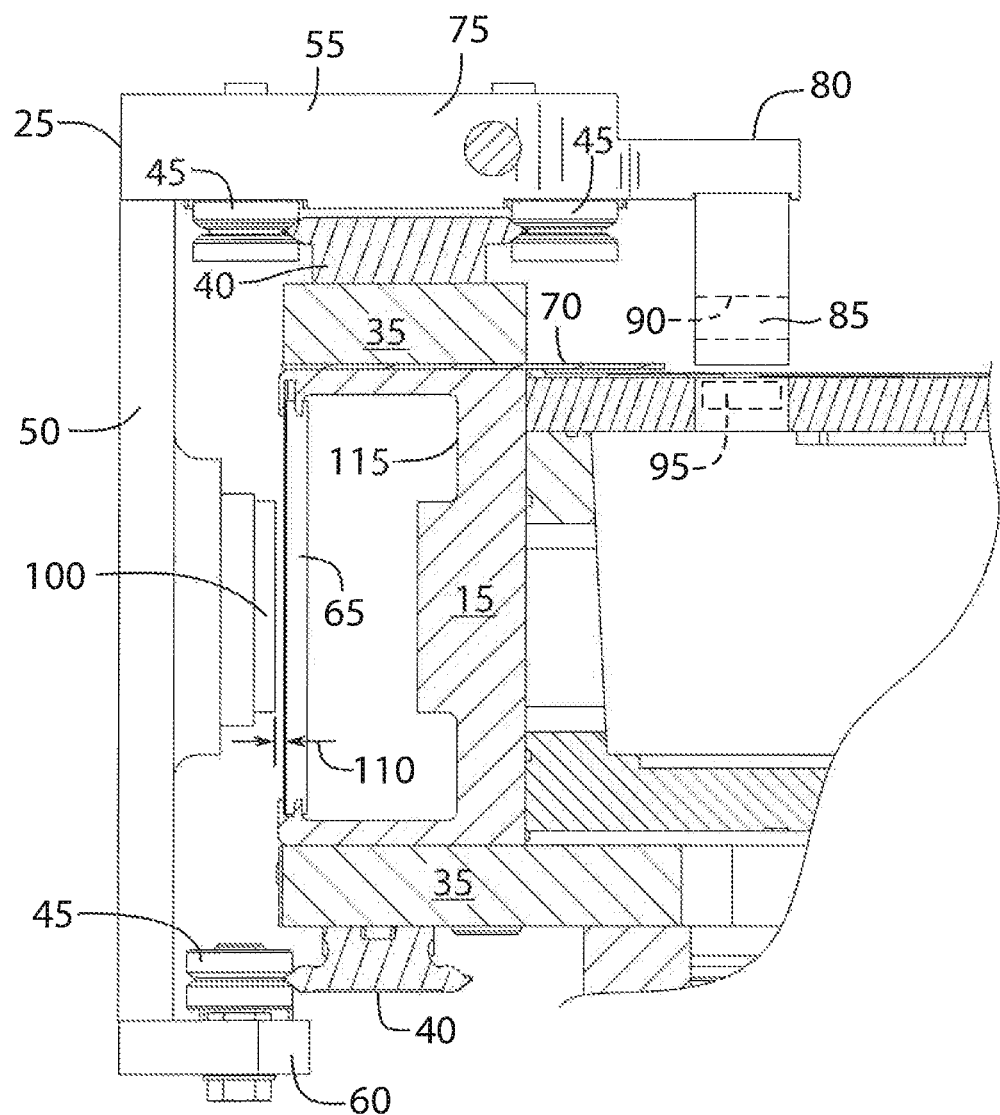
FIG. 2 is a partial sectional view of the cart system of FIG. 1.

With reference also to FIG. 2, each track segment 15, 20 includes a number of independently attached rails on which each mover 25 runs. According to the illustrated embodiment, rails extend generally along the outer periphery of the track segment 15. Each track segment 15 includes a base portion 35 (two base portions 35 are shown in this construction), a channel portion 115, and a rail portion 40 (two rail portions 40 are shown in this construction). Each mover 25 includes complementary rollers 45 to engage the rail portions 40 for movement along the track 10.

Figure 3:
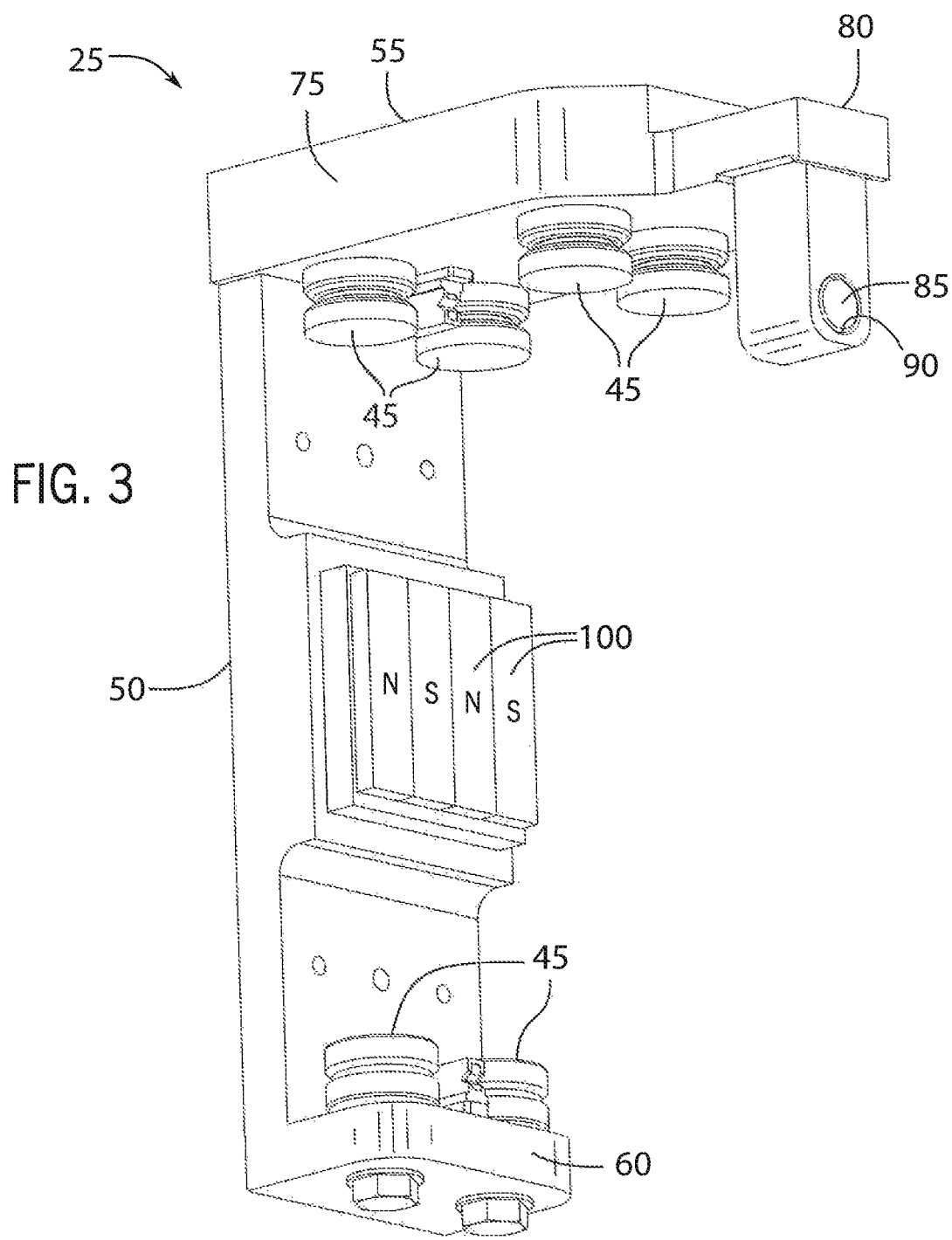
FIG. 3 is an isometric view of a mover from the cart system of FIG. 1.

With reference next to FIG. 3, an exemplary mover 25 is illustrated. Each mover 25 includes a side member 50, a top member 55, and a bottom member 60. The side member 50 is oriented parallel to a side surface 65 (FIG. 2) when the mover 25 is mounted to the track 10. The top member 55 extends orthogonal to the side member 50 at a top end of the side member 50. The top member 55 includes a first segment 75, extending orthogonally from the side member 50. The top member 55 includes a set of rollers 45 that are mounted on the lower side of the first segment 75 and are configured to engage the rail portion 45 mounted to the top surface of the track segment 15. The bottom member 60 extends orthogonal to the side member 50 at a bottom end of the side member 50 and extends for a distance sufficient to receive a third pair of rollers 45 along the bottom of the mover 25. The third pair of rollers 45 engage an outer edge of the rail portion 45 mounted to the lower surface of the track segment 15. Thus, the mover 25 rides along the rails on the rollers 45 mounted to both the top member 55 and the bottom member 60 of each mover 25. The top member 55 also includes a second segment 80 which protrudes from the first segment 75 an additional distance beyond the rail portion 40 and is configured to hold a position magnet 85. According to the illustrated embodiment, the position magnet 85 is mounted within a recess 90 on the second portion 75 and is configured to align with a sensor 95 mounted within the track segment 15.

Figure 4:
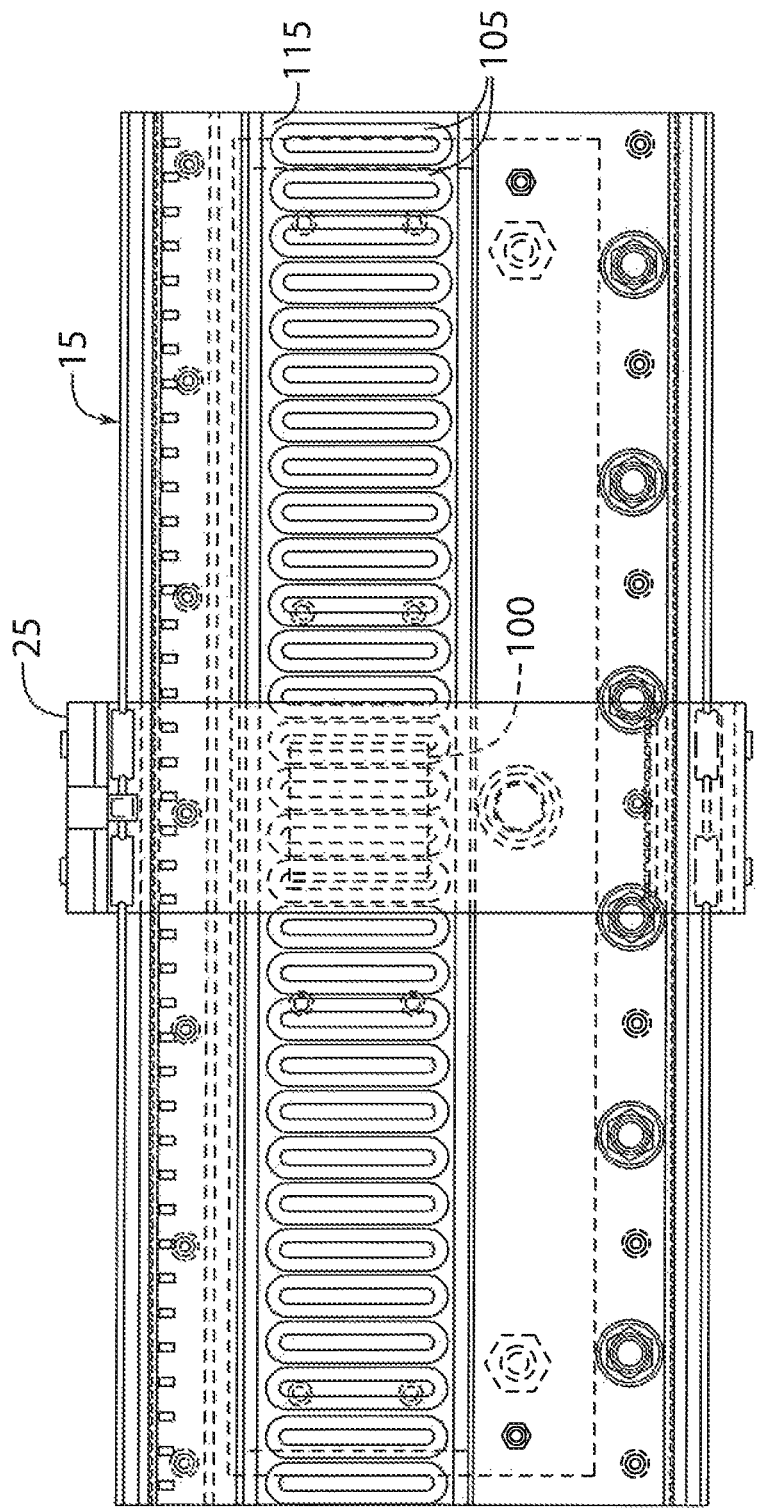
FIG. 4 is a partial side elevation view of one segment of one construction of the cart system of FIG. 1 illustrating activation coils distributed along one surface of the track segment.

A linear drive system is incorporated in part on each mover 25 and in part within each track segment 15, 20 to control motion of each mover 25 along the segment. According to the construction shown in FIG. 4, the linear drive system includes drive magnets 100 mounted to the side member 50. The drive magnets 100 are arranged in a block along an inner surface of the side member 50 with separate magnet segments alternately having a north pole, N, and south pole, S, facing the track segment 15. The drive magnets 100 are typically permanent magnets, and two adjacent magnet segments including a north pole and a south pole may be considered a pole-pair. The drive magnets 100 are mounted on the inner surface of the side member 50 and when mounted to the track 10 are spaced apart from a series of coils 105 extending along the track 10. As shown in FIG. 2, an air gap 110 is provided between each set of drive magnets 100 and the coils 105 along the track 10. On the track 10, the linear drive system includes a series of parallel coils 105 spaced along each track segment 15 as shown in FIG. 4. According to the illustrated embodiment, each coil 105 is placed in a channel 115 extending longitudinally along one surface of the track segment 15. The electromagnetic field generated by each coil 105 spans the air gap 110 and interacts with the drive magnets 100 mounted to the mover 25 to control operation of the mover 25.

Figure 5:
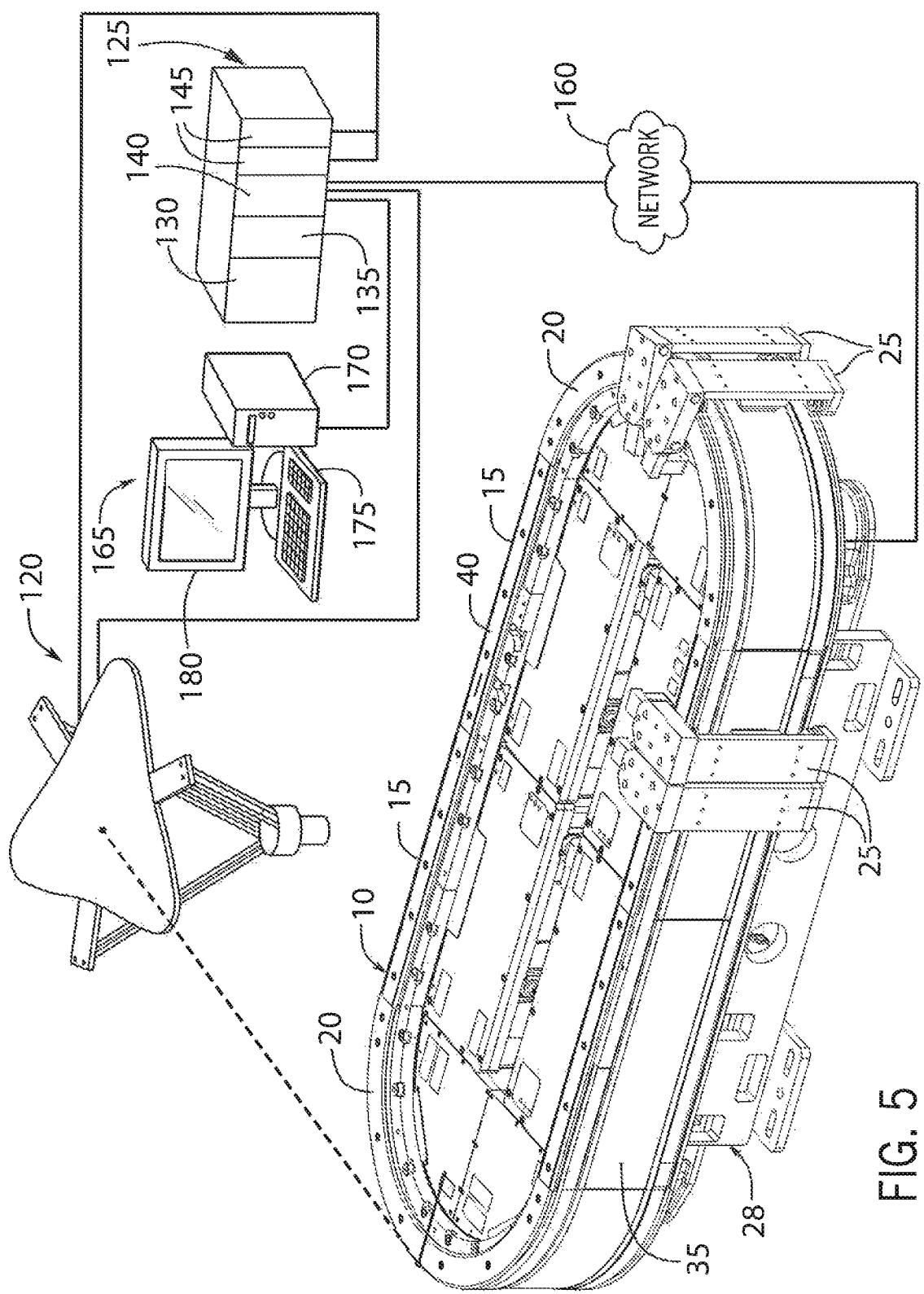
FIG. 5 is an exemplary application environment incorporating the automated independent cart system of FIG. 1 with an external robot operative to engage the transport system.

Turning next to FIG. 5, an exemplary application with a robot (or actuator) 120 which is operative to interact with the movers 25 as they travel along the track 10 is illustrated. An exemplary system controller 125, which may also be referred to herein as a motion controller, controls interaction between the robot 120 and movers 25 travelling along the track 10. The system controller 125 may be an industrial controller, referred to as a Programmable Logic Controller (PLC) or as a Programmable Automation Controller (PAC). The system controller 125 may include a power supply 130, a processor module 135, a communication module 140, and input and/or output (I/O) modules 145. It is contemplated that the system controller 125 may include a single rack or multiple racks of modules. Further, various additional modules may be included according to an application's requirements. A backplane extends between modules within a rack and backplane connectors on each module connect a module to the backplane to receive power and/or for communication between modules. The processor module includes a processor and a memory. It is contemplated that the processor and memory may each be a single electronic device or formed from multiple devices. The processor may be a microprocessor, and the memory may be a non-transitory storage medium. Optionally, the processor and/or the memory may be integrated on a field programmable array (FPGA) or an application specific integrated circuit (ASIC). The memory may include volatile memory, non-volatile memory, or a combination thereof.

The network module 140 facilitates connections to devices, remote racks, and/or other controllers located remotely from the system controller 125. Network medium connect the network module, for example, via an Ethernet connection to a network 160. The connection to the network 160 may be made directly or via a network device, such as a router, a switch, and the like. The network 160 may be an intranet, the Internet, or a combination thereof. The network 160 may be an industrial network such as EtherCAT, Profinet, DeviceNet, Ethernet I/O, ControlNet, and the like, may connect the network module 140 to other devices in the application. The network module 140 is also connected to a user interface 165, which may or may not be via the network 160.

For the construction shown, a set of I/O modules 145 connects the system controller 125 and the robot 120. Each of the I/O modules 145 may connect or disconnect from the backplane through a releasable electrical connector and may provide for one or more releasable terminals such as screw terminals or other electrical connectors allowing interconnection of the I/O modules 145 to conductors communicating with the robot 120.

The user interface 165 is provided for an operator to configure the system controller 125 and to load or configure desired motion profiles for the movers 25 and the robot 120. The motion profiles can include configuration information for the track segments 15, 20, and logical axes (e.g., gains, limits, etc.) for the movers 25. The user interface 165 may include a processing unit 170, an input device 175, including, but not limited to, a keyboard, touchpad, mouse, trackball, or touch screen, and an output device 180, such as a display. It is contemplated that each component of the user interface 165 may be incorporated into a single unit, such as an industrial computer, laptop, or tablet computer. It is contemplated that other combinations of computing devices and peripherals as would be understood in the art may be utilized or incorporated into the system controller 125 and user interface 165 without deviating from the scope of the invention.

Figure 6:
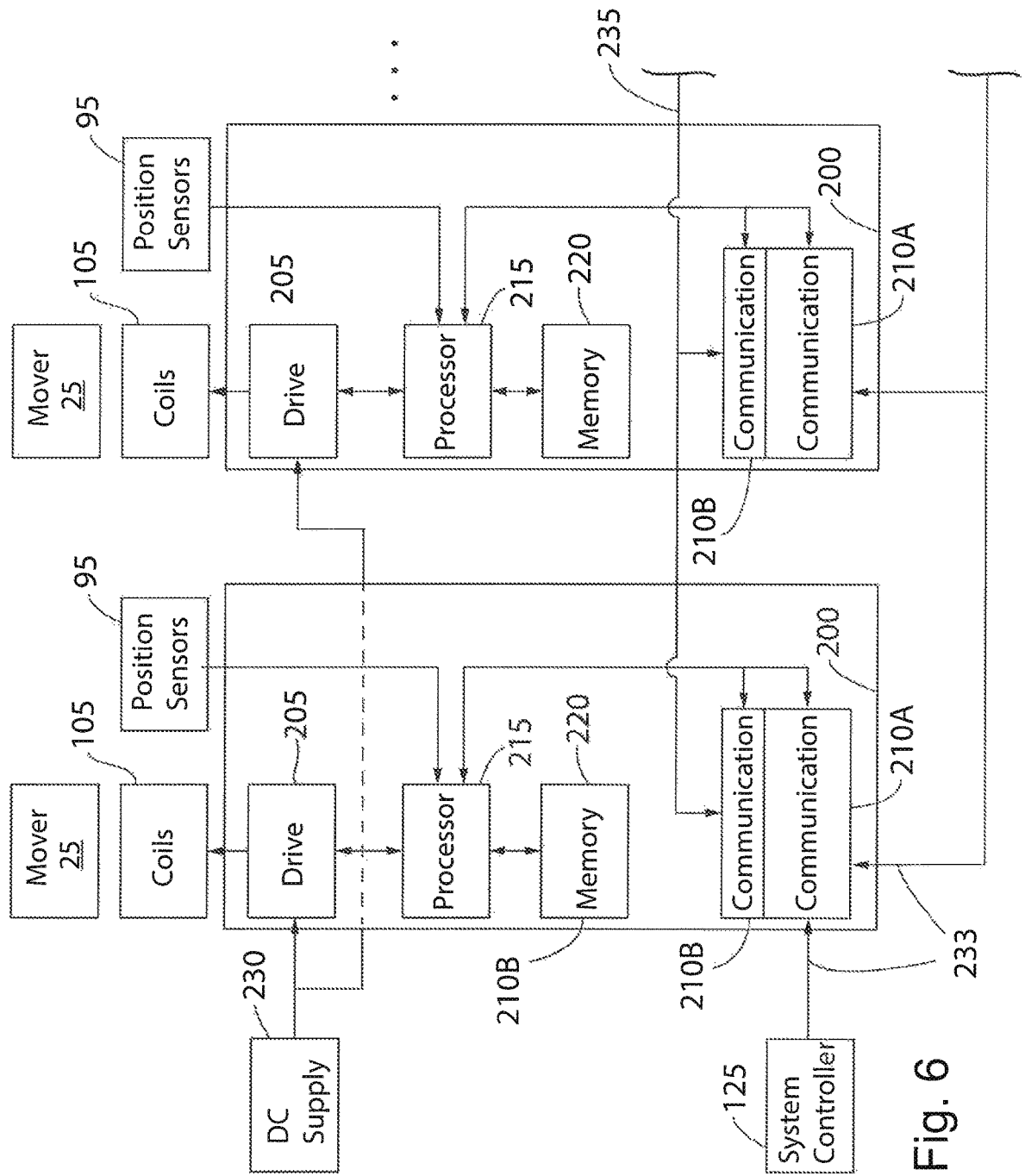
FIG. 6 is a block diagram representation of an exemplary power and control system for the cart system FIG. 1.

Turning next to FIG. 6, an exemplary power and control system for the track 10 and linear drive system is illustrated. A segment controller 200 is mounted within each track segment 15, 20. The segment controller 200 receives force command signals and generates switching signals for the drive 205 which, in turn, control activation of each coil 105. Activation of the coils 105 control and position each of the movers 25 along the track segment 15, 20 according to motion command signals originating from the system controller 125. As will be discussed in more detail below, the motion command signals are provided to one or more defined segment controllers for one or more movers 25, and the force command signals are provided from the defined segment controllers to the segment controller(s) the mover is located on.

Communication circuitry (or module) in each segment controller 200 receives communication from the system controller 125 or other segment controllers 200 and passes the communication to a processor 215 and memory 220 executing in the segment controller 200. The communication circuitry is shown as being in two blocks 210A and 210B. The communication blocks 210A allow for connection to each other for all segments, and is connected to the system controller 125. The connections provide for a frontplane 233. The communication blocks 210B allow for connection to each other for all segments, and is not connected to the system controller 125. The connections provide for a backplane 235. The frontplane 233 and the backplane 235 and what is communicated over each plane will be discussed in more detail below.

The processor 215 may be a microprocessor, and the memory 220 may be a non-transitory storage medium. Optionally, the processor 215 and/or the memory 220 within the segment controller 200 may be integrated on a field programmable array (FPGA) or an application specific integrated circuit (ASIC). It is contemplated that the processor 215 and memory 220 may each be a single electronic device or formed from multiple devices. The memory 220 may include volatile memory, non-volatile memory, or a combination thereof.

According to the illustrated embodiment in FIG. 6, each segment controller 200 generates switching signals to control operation of switching devices within respective drives 205 mounted within the track segment 15, 20. The drive 205 within each track segment 15, 20 are connected between a DC supply 230 and the coils 105. The switching signals are generated to sequentially energize coils 205 along a track segment, where the energized coils 105 create an electromagnetic field that interacts with the drive magnets 100 on a mover 25 to control motion of the movers 25 along the corresponding track segment 15, 20. The switching signals control operation of switching devices in connection with the drive coils 105. The switching devices of the drive 205 may be solid-state devices that are activated by the switching signals, including, but not limited to, transistors, such as insulated-gate bipolar transistors (IGBTs) or metal-oxide semiconductor field-effect transistors (MOSFETs), thyristors, or silicon-controlled rectifiers.

The processor 215 also receives a feedback signal from the position sensors 95 along the track segments 15, 20 to provide an indication of the presence of one or more movers 25. While the position sensors 95 are shown as a single block, it is contemplated that the position sensors 95 typically includes multiple sensors and related conditioning circuitry. In each track segment 15, 20, the processor 215 can generate the switching signals to control the drive 205 to provide power to respective coils 105 for propelling a mover 25 while continuously receiving feedback signals for determining positions of the mover 25. The processor 215 also receives feedback signals from voltage and/or current sensors mounted at an input or output of the track segment 15, 20 providing an indication of the current operating conditions of a DC bus within the track segment 15, 20 or the operating conditions of a coil 50 connected to the track segment 15, 20.

During operation of the automated system, the system controller 125 provides coordinated motion for the system and is operative to generate motion commands for both the movers 25 along the track 10 and an external device, such as the illustrated robot. It is contemplated that the coordinated motion may be, for example, instruction(s) in a control program executing on the system controller 125. For example, the coordinated motion may be two or more instructions in the control program configured to generate motion of a mover 25 and the robot 120 in tandem with each other.

Figure 7:
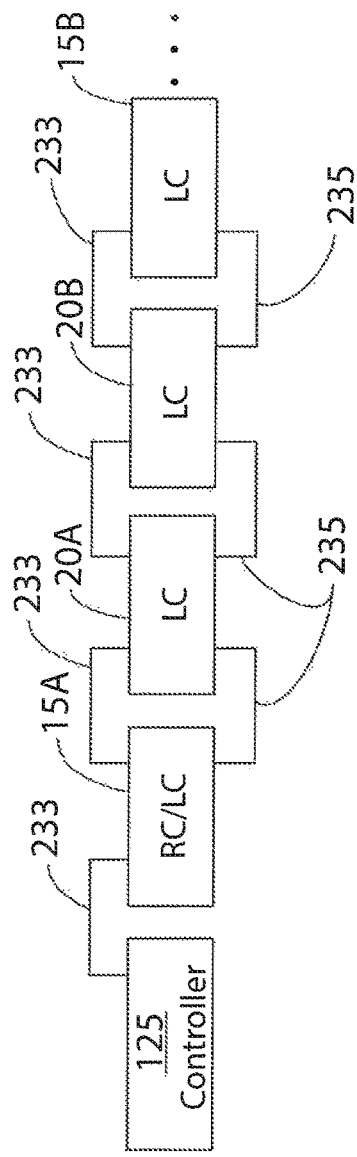
FIG. 7 is a block diagram representation of a system controller and segment controllers in communication.

With reference to FIG. 7, the remote control architecture centralizes motion control responsibilities to one track segment (e.g., 15A) for a specific set of movers. This track segment 15A acts as a quasi-gateway when compared to prior systems. The track segment 15A (remote control "RC" segment) is responsible for motion control for its given mover 25 on an entire track 10 as the movers traverse the entire track. Individual track segments 10, 15 are responsible for managing the dynamic relationship between the movers 25 and the segments 10, 15 upon which they are located. Each track segment 15, 20 (local control "LC" segment) is responsible for force control for all movers 25 located on it. A track segment 15A can be both an RC track segment and an LC track segment. However, track segments 20A, 20B, and 15B are only LC track segments. A track segment 15, 20 requires computational capability as follows: force control based on segment physical capacity (e.g., 8 movers per one track segment in one implementation), and motion control based on track fill requirements, not segment physical capacity (e.g., 4 movers per one track segment).

Before continuing further, it should be understood that the description herein may refer to the RC track segment and the LC track segment as performing a function or operation. In reality, the segment controller 200 causes (e.g., through executing stored instructions) the RC or LC track segment to perform the function or operation.

The backplane 235 is used to distribute force commands from RC segment(s) to LC segments (R2L packets) and collect position feedback from LC to RC segments (L2R packets). An R2L packet refers to a communication packet on the backplane 235 that originates at a remote control track segment, sent to a local control track segments. An L2R packet refers to a communication packet on the backplane 235 that originates at a local control track segment, sent to a remote control track segment. In one implementation, the backplane network communications are synchronized to a servo update rate and the backplane communications run at the servo update rate.

Figure 8:
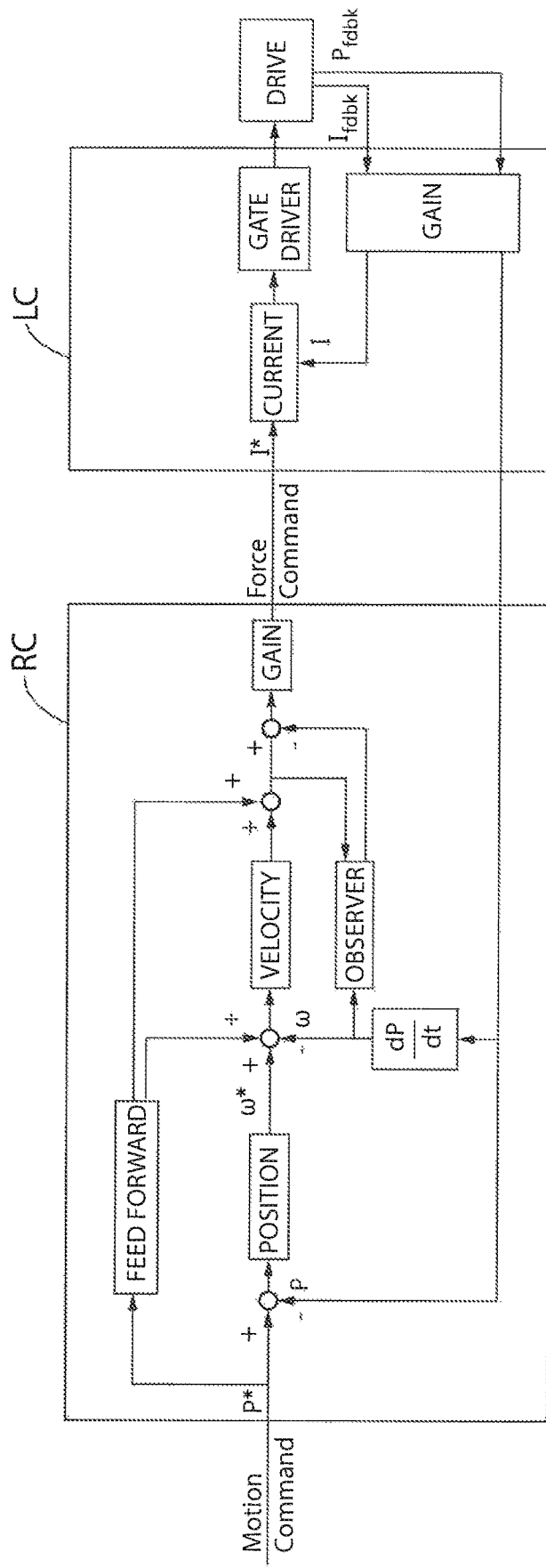
FIG. 8 illustrates the partitioning of motion and force control and the allocation of those functions to segment controllers.

With reference to FIG. 8, motion commands from the system controller 125 are provided to the RC track segment via the frontplane 233. FIG. 8 schematically shows the input to the RC segment as being a position reference signal (P*). The RC track segment includes a number of control loops, or regulators. Each control loop, or regulator, may include one or more controller gains and control paths, and is configured to provide a desired output according to a reference input. According to the implementation illustrated, the RC track segment includes a position control loop, and a velocity control loop. The control loops are shown as cascading control loops where an output of one control loop is provided as an input to another control loop. The RC track segment also includes a feedforward path and a load observer. It is contemplated that various other control topologies may be utilized within the RC segment. The output of the RC track segment is a force command for a mover 25.

Force control includes applying the force command to a mover 25 by determining and applying the necessary current in the appropriate coil(s) 105 that affects force production for that mover 25. FIG. 8 shows the force command being translated to a current reference signal (I*) provided to a current regulator 120. The current regulator 120 uses the current reference signal (I*) and a current feedback signal ($I_{fdbk}$), generated by a current sensors to regulate a current regulator output signal to a desired value. In one embodiment, the current regulator output signal is a voltage reference signal for the gate driver 60 which, in turn, generates the switching signals 31 to the drive section 205. The position feedback device 44 generates the position feedback signal ($P_{fdbk}$) used by the control module 55.

Accordingly, FIG. 8 provides a simple example of a motion command being provided to an RC track segment, which then provides a force command to an LC track segment. Given that ICT has many carts moving concurrently and may be part of a larger motion system, the actual generating of the motion commands and force commands is likely more complex than is shown. However, the techniques used to generate the motion and force commands can vary depending on the design of the ICS. It is envisioned, though, that motion control includes fine interpolation, position control, velocity control, load observer(s), and/or filtering (low pass, notch, etc.). The output of motion control is a force command for a mover. Force control includes applying the force command to an LC track segment by determining and applying the necessary current in the appropriate coil(s) that affects force production for that mover 25. Force control may also include a current regulator for each coil. A force feedback estimate may be provided which would be calculated by using the coil current feedback and inverse commutation tables.

Figure 9:
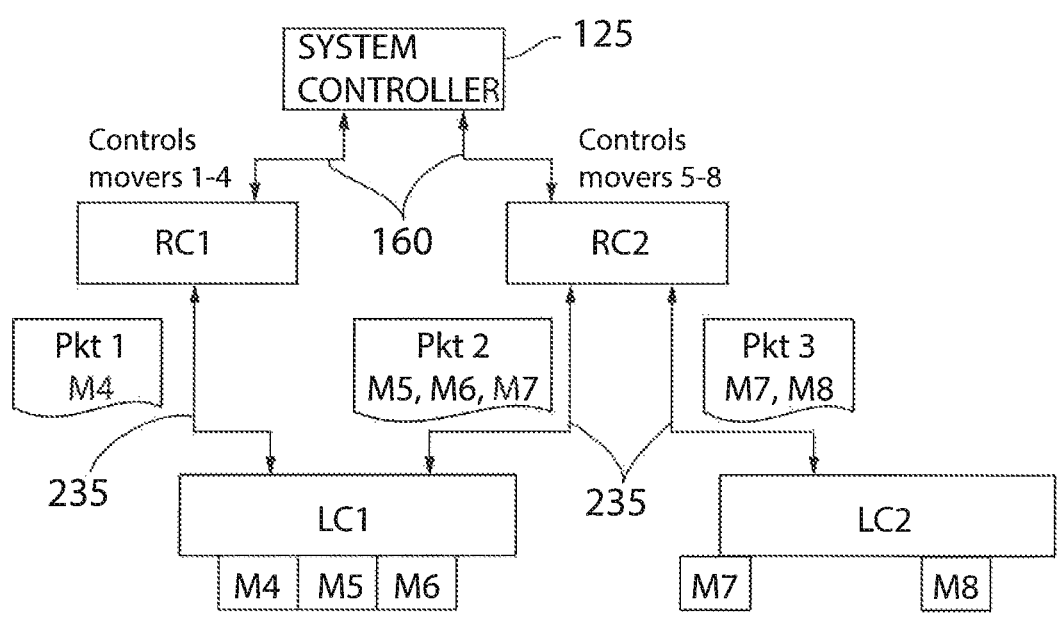
FIG. 9 is a block diagram representation of a system controller, segment controllers, and movers of a track.

FIG. 9 is a snapshot in time for a track having two RC track segments, four LC track segments (only two shown), and eight movers. The figure only shows the RC and LC functions for simplicity. System controller 125 has fixed motion connections to RC1 and RC2. RC and RC2 manage gaps between segments by duplicating communications as mover approaches a gap. For example, communication for mover M7 is communicated to both LC1 and LC2. Communication among RC1-RC2 and LC1-LC4 is over the backplane 230. PKT refers to a communication packet from RC1-RC2 to LC1-LC4 or vice-versa.

Servo control has sampling synchronized to the servo loop execution. This implies that the R2L and L2R communications should be synchronized to the servo update period and PWM signal. For a small track implementation (e.g., sixteen or less track segments), servo updates over the entire track and hence, R2L and L2R communications, are concentrated on the backplane.

The track communication architecture can support staggering servo updates, which may increase backplane utilization. Staggering every other RC segment to run one-half servo update period (SUP) increases backplane utilization and can increase track size and/or mover count.

The assignment of movers to RC segment(s) can affect backplane latency. Backplane latency affects track size and mover count. In one implementation, the operator assigns maximum movers per track segment to combine multiple mover data in a single packet. This can result in less packets on the backplane 230. For some backplanes, the backplane is specifically designed as a communication line; i.e., the first and last segments are not communicatively connected. Defining track segments in the middle of the track as RCs reduces the number of hops for R2L and L2R communications, thereby reducing latency.

Figure 10:
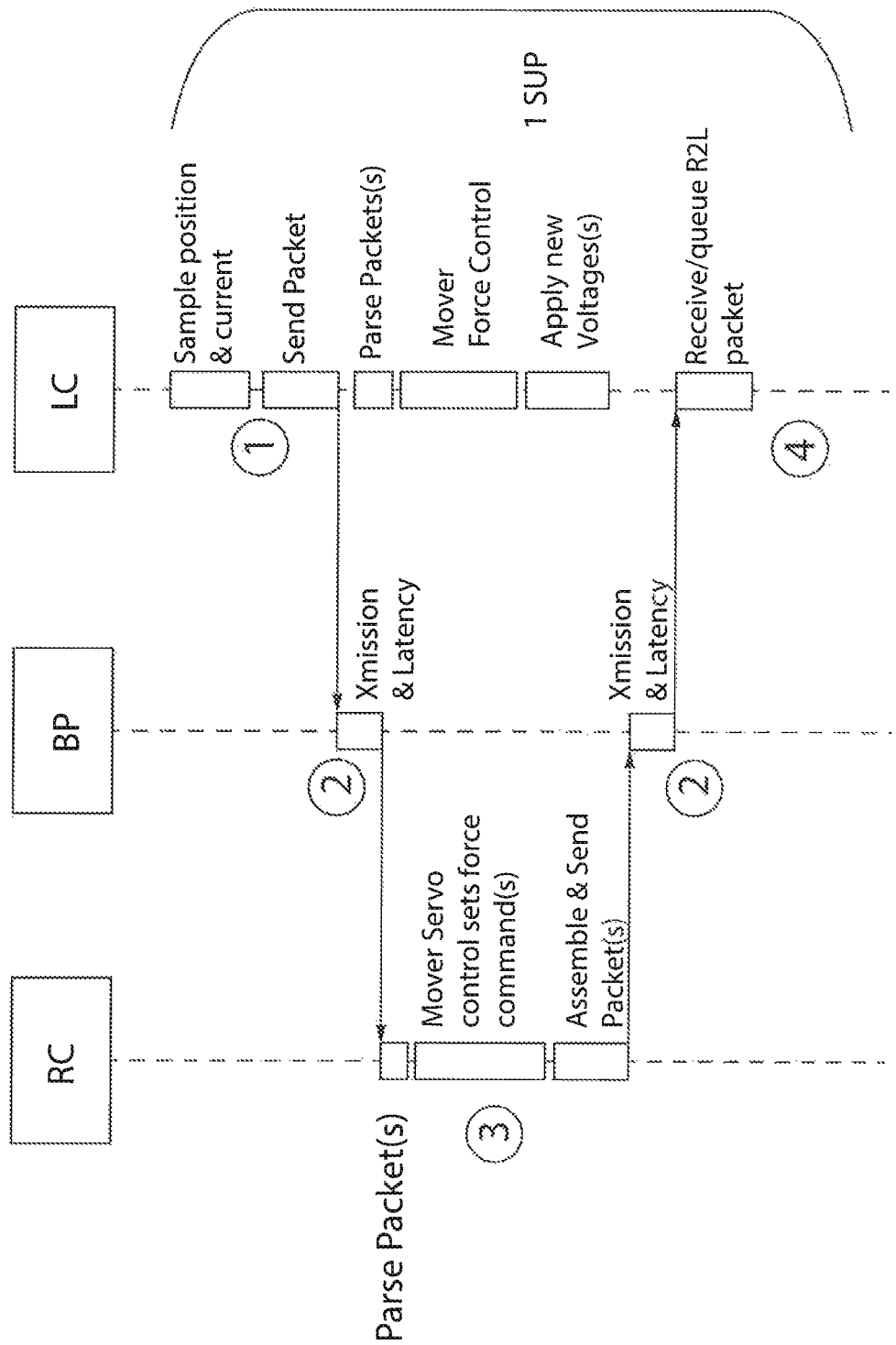
FIG. 10 is a flow diagram representing LC track segment and RC track segment relationships according to one implementation.
Figure 11:
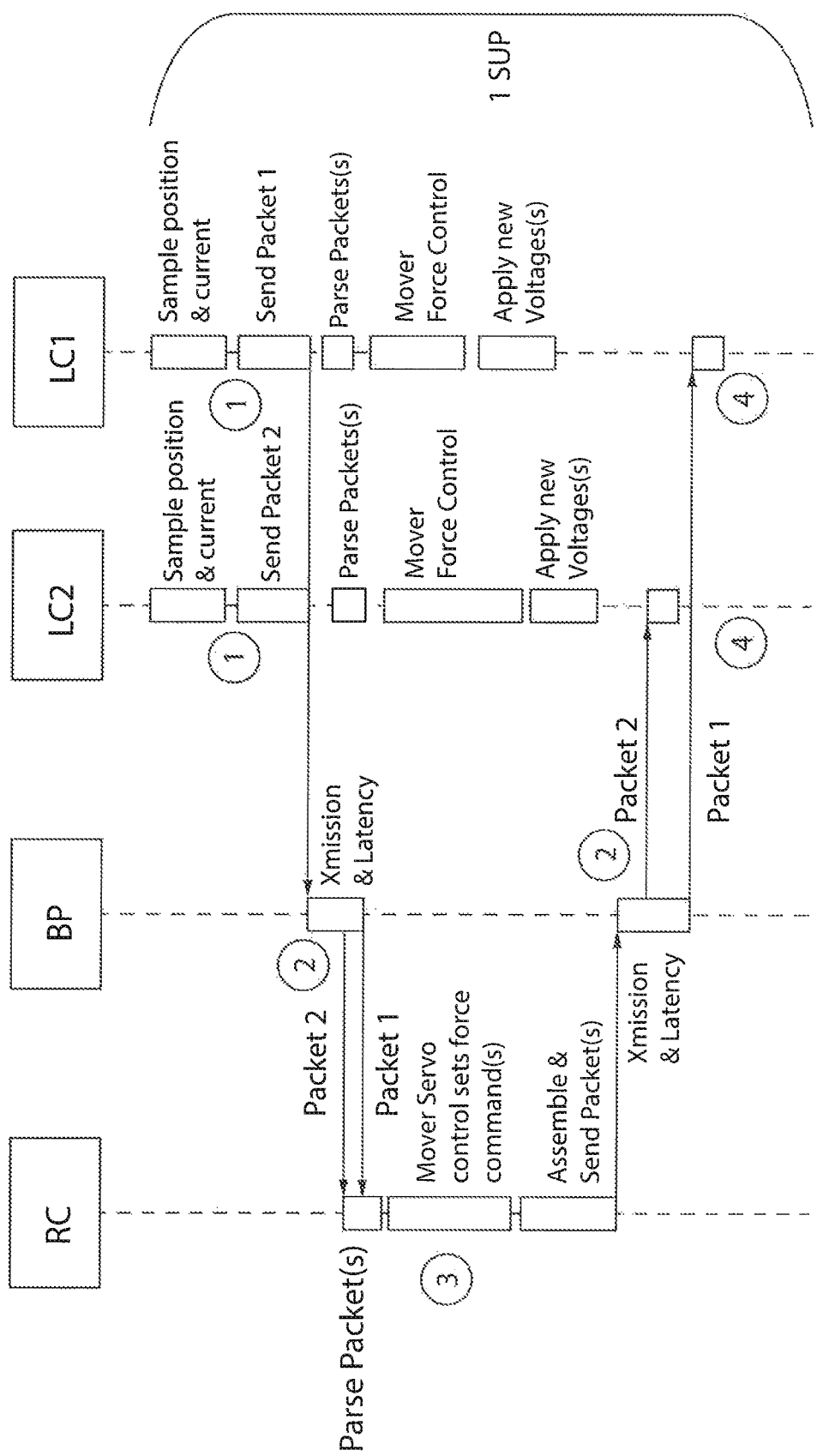
FIG. 11 is a flow diagram representing the relationships between multiple LC track segments and an RC track segment according to another implementation.

The sequence diagrams of FIGS. 10 and 11 illustrate the relationship between remote control and local control segments. The sequence diagrams start with an LC sampling position and current. The diagrams do not show how the RC segment manages the communications. The sequence diagrams also ignore that the RC track segment may also be an LC track segment for simplicity. When the LC track segment is the same track segment as the RC track segment, no external communication is required. The first figure shows a single LC track segment, and the second figure shows two LC track segments. "BP" is the backplane in FIGS. 10 and 11. The entire sequence shown occurs in one servo update period (SUP). The sequence steps are described below.

For step 1, LC track segments sample position and current. Position sampling can occur using time synchronization so that position samples occur at a known time reference with the SUP. RC track segments should know the position sample reference time and not require a time stamp to be sent in the packet. Using a (Common Industrial Protocol) CIP Sync object and a PTP (Precision time protocol) time synchronization enables synchronized sampling on all track segments 15, 20. Another implementation includes sending a single time stamp in a packet corresponding to a specific time reference of the position sampling on the LC track segment. All track segments can have a map of mover IDs and the associated RC track segments perform motion control for each mover 25. An LC track segment assembles an L2R packet of data for each RC track segment associated with the movers' 25 resident on the LC track segment. Each packet includes all data for all movers 25 on the LC track segment controlled by that RC track segment. FIG. 9 illustrates the relationship between movers, LC track segments and RC track segments. In the example, RC1 is responsible for M1-M4 and RC2 is responsible for movers M5-M8. LC1 has to create a packet for RC1 with M4 data. LC1 also has to create a packet for movers M5, M6 for RC2. All the movers on LC2 are associated with RC2, so LC2 creates a single packet with data for both movers. An exemplary list of data in a packet may include one or more of the following: mover count (number of movers in the packet); mover ID(s); incremental position change(s) (velocity, for motion control); force feedback estimate(s); a limited set of real time read attribute data; LC track segment status (segment fault active, current regulator saturation/limiting, etc.); and a time stamp for position capture.

For step 2, each packet traverses the backplane 230. The time required for packet transmission and receipt is trivial for these examples, but becomes more significant for larger tracks with many packets. A backplane throughput can be a critical design metric to scale up to large tracks.

Upon the LC track segment sending the L2R packet over the backplane 230, the LC track segment parses R2L packets with command information for all the movers that it controls locally. The LC track segment performs commutation, current regulation on each individual coil, and ultimately applies new coil voltages.

For step 3, the RC track segment receives and parses packets for all the movers 25 that it controls. The RC track segment performs motion control for all movers resulting in force commands. The RC track segment can execute the motion control on all axes in succession to optimize cache memory access, so all the mover feedback data should be parsed and ready before unleashing the motion control algorithms. The RC track segment assembles an R2L packet of data for each LC track segment with resident movers that it controls. The packet can include all data for all movers on the LC track segment controlled by that RC track segment. An exemplary list of data in a packet may include one or more of the following: mover count (number of movers in packet); mover ID; force command (Direct force control, or Vreg output); adjacent mover absolute position (commutation angle for mover hand off between LC track segments); adjacent mover velocity (commutation angle advance for mover hand off between LC track segments); and a limited set of real time write attribute data.

For step 4, the LC track segment receives R2L packets with command information for all the movers that it controls locally. The R2L packets are queued for the next SUP cycle.

Figure 12:
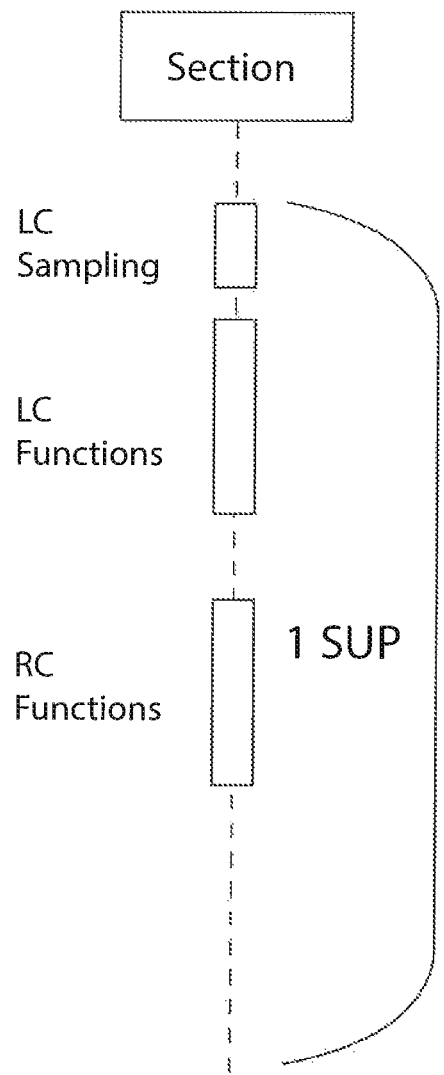
FIG. 12 is a flow diagram representing sequencing of an RC/LC track segment.

FIG. 12 illustrates how a track segment fulfills the roles of RC and LC. The RC and LC functions are time shifted within a SUP and don't overlap. 55

Realistically, the time spent on the RC/LC functions cannot consume the entire SUP as a track segment has other responsibilities such as Ethernet/CIP stack, Axis State Machine, DC bus control, etc.

A track that is entirely filled with movers is typically not useful. A track fill ratio can be defined as the ratio of the maximum number of movers allowed on a track to the number of movers that can physically fit on a track. An example fill ratio would be 0.5 corresponding to ½ the track being filled with movers. A benefit of the RC architecture is that sections do not have to provide the motion control capacity corresponding to the maximum number of movers that can fit on the section. Each section should be able to perform motion control for a number of movers corresponding to the track fill ratio. Motion control is evenly distributed across all sections on a track and not concentrated at any section based on the number of movers on that can fit on the section. Each section does have to have the force control capacity corresponding to the maximum number of movers that can be located on the section.

Ideally, servo performance would be identical across the gaps, but this is difficult for at least the following reasons: 1) the gap creates a discontinuity in the drive coils and feedback system; 2) force control should be managed by the two track segments on each side of the gap; 3) when a mover approaches a new track segment, the new track segment cannot detect position of the mover, but it has to participate in force control; 4) when a mover is close to the gap, both segments detect position, but the detected positions can differ. Remote Control segments are responsible for mover position control, force command generation and communication with local control track segments. Therefore, RC track segments should manage the mover hand off.

FIG. 9 illustrates how an RC track segment would manage mover handoff to a receiving LC track segment. As movers approach segment boundaries, the RC track segment responsible for the mover starts sending mover position and force command to the new LC track segment to which the mover will transition. The RC can determine the segment position to initiate this communication based on the mover speed and segment SUP. Another strategy is to always send position and force data to the adjacent track segment as it will do no harm when the mover is not in a position where the receiving track segment can apply any force. RC track segments should send the position received from one LC track segment (LC2 in this example) to the receiving track segment (LC1 in this example). Receiving LC track segments will get position data that corresponds to the same update as the force command (refer to FIG. 11).

A method to provide centralized motion control for a track based system from the view of a PLC, using a fixed connection between a controller and a single track component (segment). Thus, a method of centralizing motion control responsibility and distributing force control responsibility on track based systems is disclosed. The method provides a single controller interface communication point.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A method of controlling operation of a plurality of movers in an independent cart system, the independent cart system including a track having a plurality of track segments, the method comprising the steps of:
    obtaining at a first controller a motion command for a first mover;
    receiving at the first controller from a segment controller for one of the plurality of track segments a position feedback signal corresponding to a location for the first mover along the track segment corresponding to the segment controller, wherein the first controller is not located along the track segment on which the first mover is present;
    determining at the first controller a force command for the first mover based on the motion command and the position feedback signal;
    transmitting the force command from the first controller to the segment controller; and controlling with the segment controller an excitation field to interact with a drive member mounted on the mover based on the force command.

2. The method of claim 1, and further comprising:
obtaining at the first controller a second motion command for a second mover;
receiving at the first controller from a segment controller for one of the plurality of track segments a second position feedback signal corresponding to a location for the second mover along the track segment corresponding to the segment controller;
determining at the first controller a second force command for the second mover based on the second motion command and the second position feedback signal; and
controlling with the segment controller corresponding to the track segment on which the second mover is located a second excitation field to interact with a second drive member mounted on the second mover based on the second force command.

3. The method of claim 2, wherein the first mover and the second mover are located on a single track segment and the segment controller corresponding to the first mover and the segment controller corresponding to the second mover are the same.

4. The method of claim 2, wherein the first mover is located on a first track segment selected from the plurality of track segments and the second mover is located on a second track segment selected from the plurality of track segments and wherein the segment controller corresponding to the first mover is a first segment controller and the segment controller corresponding to the second mover is a second segment controller.

5. The method of claim 1, wherein the first controller is a second segment controller configured to control excitation fields for a track segment other than the track segment on which the first mover is located.

6. The method of claim 1, further comprising the steps of:
receiving at the segment controller a second motion command for a second mover;
receiving at the segment controller a second position feedback signal corresponding to a location for the second mover; and
determining at the segment controller a second force command for the second mover based on the second motion command and the second position feedback signal.

7. The method of claim 6, wherein the second mover is present on the track segment corresponding to the segment controller.

8. The method of claim 6, wherein the second mover is present on one of the plurality of track segments not corresponding to the segment controller.

9. The method of claim 1, wherein:
a first portion of the first mover is located on a first track segment;
a second portion of the first mover is located on a second track segment;
the step of determining at the first controller the force command for the first mover further comprises the steps of:
determining at the first controller a first force command for the first track segment, and
determining at the first controller a second force command for the second track segment; and
the step of controlling with the segment controller the excitation field further comprises the steps of:

controlling with a first segment controller a first excitation field on the first track segment to interact with the first mover, and
controlling with a second segment controller a second excitation field on the second track segment to interact with the first mover.

10. An independent cart system, comprising:
a track having a plurality of track segments, wherein each track segment includes:
a plurality of drive coils, and
a segment controller configured to selectively control the plurality of drive coils to generate an excitation field along the corresponding track segment;
a plurality of movers, wherein each mover includes a drive member configured to interact with the excitation field;
a position feedback system configured to generate a plurality of position feedback signals, each position feedback signal corresponding to a location of a first mover, selected from the plurality of movers; and
a first controller configured to:
obtain a motion command for the first mover,
receive from the segment controller for each of the plurality of track segments the position feedback signal corresponding to a location of the first mover as the first mover travels along the track,
determine a force command for each of the plurality of track segments on which the first mover is presently located, and
transmit the force command for the first mover to the segment controller from which the first controller received the position feedback signal.

11. The independent cart system of claim 10, wherein the first controller is further configured to:
obtain a second motion command for a second mover, the second mover selected from the plurality of movers,
receive from the segment controller for each of the plurality of track segments a second position feedback signal corresponding to a location of the second mover as the second mover travels along the track,
determine a second force command for each of the plurality of track segments on which the second mover is presently located, and
transmit the second force command for the second mover to the segment controller from which the first controller received the second position feedback signal.

12. The independent cart system of claim 11, wherein:
the first mover and the second mover are located on one track segment, and
the segment controller corresponding to the first mover and the segment controller corresponding to the second mover are the same.

13. The independent cart system of claim 11, wherein:
the first mover is located on a first track segment,
the second mover is located on a second track segment,
the segment controller corresponding to the first mover is a first segment controller, and
the segment controller corresponding to the second mover is a second segment controller.

14. The independent cart system of claim 10, wherein the first controller is a second segment controller configured to generate excitation fields for a track segment other than the track segment on which the first mover is located.

15. The independent cart system of claim 10, wherein the segment controller corresponding to the first mover is further configured to:
receive a second motion command for a second mover, receive the position feedback signal corresponding to a location for the second mover along the track, and determine a second force command for the second mover based on the second motion command and the position feedback signal corresponding to the location for the second mover.

16. The independent cart system of claim 15, wherein the second mover is present on the track segment corresponding to the segment controller.

17. The independent cart system of claim 15, wherein the second mover is present on one of the plurality of track segments not corresponding to the segment controller.

18. The independent cart system of claim 10, wherein:
a first portion of the first mover is located on a first track segment;
a second portion of the first mover is located on a second track segment; and
the first controller is further configured to:
  determine a first force command for the first track segment,
  determine a second force command for the second track segment,
  transmit the first force command to the first track segment, and
  transmit the second force command to the second track segment.

19. An independent cart system, comprising:
a track having at least a first track segment and a second track segment, wherein:
the first track segment includes a first plurality of drive coils and a first segment controller,
the first segment controller is configured to selectively control the first plurality of drive coils to generate a first excitation field along the first track segment,
the second track segment includes a second plurality of drive coils and a second segment controller, and
the second segment controller is configured to selectively control the second plurality of drive coils to generate a second excitation field along the second track segment; and
a plurality of movers, wherein:
each mover includes a drive member configured to interact with the first and second excitation fields,
the first segment controller is further configured to:
  (a) receive a position feedback signal for a first mover, where the first mover is one of the plurality of movers not present on the first track segment,
  (b) receive a motion command for the first mover, and
  (c) determine a force command for the first mover, and
the second segment controller is further configured to:
  (d) receive a position feedback signal for a second mover, where the second mover is one of the plurality of movers not present on the second track segment,
  (e) receive a motion command for the second mover, and
  (f) determine a force command for the second mover.

20. The independent cart system of claim 19 wherein:
the first segment controller is configured to perform steps (a)-(c) in a first update period,
the second segment controller is configured to perform steps (d)-(f) in a second update period, and
execution of the first and second update periods are staggered from each other.

\* \* \* \* \*